United States Patent
Tsiatsikas et al.

(10) Patent No.: US 10,931,598 B2
(45) Date of Patent: Feb. 23, 2021

(54) METHOD AND SIP REGISTRAR SERVER FOR MANAGING TRANSMISSION RESOURCES IN A SIP-BASED COMMUNICATION SYSTEM

(71) Applicant: Unify Patente GmbH & Co. KG, Munich (DE)

(72) Inventors: Zisis Tsiatsikas, Salonika (GR); Athanasios Pagonis, Vrilissia (GR); Nikolaos Lazaropoulos, Athens (GR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 16/452,660

(22) Filed: Jun. 26, 2019

(65) Prior Publication Data

US 2020/0007596 A1 Jan. 2, 2020

(30) Foreign Application Priority Data

Jun. 28, 2018 (EP) ..................................... 18180307
Jun. 4, 2019 (EP) ..................................... 19178256

(51) Int. Cl.
| | | |
|---|---|---|
| G06F 15/16 | (2006.01) | |
| H04L 12/911 | (2013.01) | |
| H04L 12/919 | (2013.01) | |
| H04L 29/06 | (2006.01) | |

(52) U.S. Cl.
CPC .......... *H04L 47/826* (2013.01); *H04L 47/765* (2013.01); *H04L 47/822* (2013.01); *H04L 63/101* (2013.01); *H04L 65/105* (2013.01); *H04L 65/1006* (2013.01); *H04L 65/1073* (2013.01)

(58) Field of Classification Search
None
See application file for complete search history.

(56) References Cited

U.S. PATENT DOCUMENTS

| | | |
|---|---|---|
| 2005/0141464 A1 | 6/2005 | Willey et al. |
| 2007/0201409 A1 | 8/2007 | Kandlur et al. |
| 2009/0180378 A1 | 7/2009 | Noel et al. |
| 2009/0225746 A1 | 9/2009 | Jackson et al. |
| 2011/0107364 A1* | 5/2011 | Lajoie ................. H04L 65/1016 725/25 |

(Continued)

OTHER PUBLICATIONS

European Search Report for EP18180307.3 dated Dec. 6, 2018.

*Primary Examiner* — Phuoc H Nguyen
(74) *Attorney, Agent, or Firm* — Buchanan Ingersoll & Rooney PC

(57) ABSTRACT

A computer apparatus (e.g. a server) and a method for managing transmission resources in a SIP-based communication system can include use of a SIP registrar server that is adapted to receive register requests from a number of clients connected to the SIP registrar server via a communication network. Each client can be granted a predetermined number of register requests in a predetermined first time period where each register request corresponds to a slot. In the first time period, at least one slot not used by a first client can be lent to a second client. In a second time period, the at least one slot lent to the second client can be reclaimed by the first client or another client. The reclaiming of the lent slot(s) can include making the second client function as a proxy for other clients according to a third party registration process.

12 Claims, 9 Drawing Sheets

(56) References Cited

U.S. PATENT DOCUMENTS

| | | | |
|---|---|---|---|
| 2012/0182867 A1* | 7/2012 | Farrag | H04W 28/0236 |
| | | | 370/230 |
| 2013/0272253 A1 | 10/2013 | Veenstra et al. | |
| 2015/0067819 A1* | 3/2015 | Shribman | H04L 67/06 |
| | | | 726/12 |
| 2016/0095016 A1* | 3/2016 | El-Refaey | H04W 16/14 |
| | | | 370/329 |
| 2016/0306672 A1* | 10/2016 | Chin | G06F 9/505 |

\* cited by examiner

METHOD AND SIP REGISTRAR SERVER FOR MANAGING TRANSMISSION RESOURCES IN A SIP-BASED COMMUNICATION SYSTEM

CROSS-REFERENCE TO RELATED APPLICATIONS

The present application claims priority to European Patent Application Nos: EP18180307.3, filed on Jun. 28, 2018 and EP19178256.4, filed on Jun. 4, 2019. The entirety of these patent applications are incorporated by reference herein.

FIELD

The present invention deals with an apparatus and method for managing transmission resources in a Session Initiation Protocol (SIP) based communication system as well as with a corresponding SIP registrar server. It is also contemplated embodiments of the system and registrar server could also be used in accordance with other protocols.

BACKGROUND

Network entities often need to work collaboratively. This means that the process of sharing and borrowing resources between them is a common procedure. For example, resources that are not used by a device in a first timeframe may be borrowed to another device that requires more resources in that timeframe than it is actually granted. For example, for a plurality of clients which are connected to a SIP registrar server via a communication network and which respectively send register requests to the registrar server, a procedure is known according to which unused slots for sending register requests may be borrowed. For example, if every client from a plurality of clients which connect to the registrar server is allowed to send 10 requests, whereby each request corresponds to a slot, then the situation may occur that some of the slots are not used by clients which do not send many register request, while others may need more slots than they have been granted. Therefore, the slots may be redistributed according to the current needs of the respective clients. For example, a client may "borrow" slots from another client that does not need all slots available for that client.

However, in such an environment, in which resources may be shared and borrowed, devices may act in a "selfish" or "greedy" manner. This may occur, for example, in the following situations:
1. For actual normal traffic: After an Advanced Telephony Connector (ATC) failure, the burst of registrations creates a flash event in the registrar server (e.g. OpenScapeVoice OSV registrar), i.e., legitimate registrations arrive in the form of a burst, thus, triggering the security mechanisms.
2. For actual attack traffic: An army of infected "devicezombies" initiates a Distributed Denial of Service (DDoS) attack in the registrar server (e.g. OSV registrar).

SUMMARY

We have determined that it is desirable that devices that act in a "selfish" or "greedy" manner need to be excluded from gaining additional resources in further timeslots or timeframes. Also, it is desirable that legitimate requests from "good" devices or clients are not dropped or blocked, but only those requests are blocked or dropped which originate from devices exhibiting true abnormal behavior. Also, there exists a problem with respect to the above mentioned procedure when returning or reclaiming of the borrowed slots. Namely, there are various scenarios conceivable, according to which a client that has borrowed resources acts in a "greedy" or "selfish" manner with respect to the registrations sent to the system, as mentioned above.

Considering the above, embodiments of the present invention can be based on the object to provide a method and a corresponding server for ensuring that borrowed resources are returned reliably. This object can be solved in a method for managing transmission resources in a SIP-based communication system. A SIP registrar server can also be provided to address such problems. The SIP registrar server can also be utilized in embodiments of the method.

Embodiments of a method for managing transmission resources in a SIP-based communication system by a SIP registrar server are provided. The method can be employed in an arrangement that includes an SIP registrar server that is adapted to receive register requests from a number of clients connected to the SIP registrar server via a communication network. Each client of the number of clients can be granted a predetermined number of register requests in a predetermined first time period. Each register request can correspond to a slot. Embodiments of the method utilizing the SIP registrar server and/or the clients can include lending, in the first time period, at least one slot not used by a first client to a second client and reclaiming, in a second time period, the at least one slot lent to the second client. This second time period can occur after the first time period. The reclaiming can include making the second client function as a proxy for the other clients according to a third party registration process.

Embodiments of the method can provide a relatively simple procedure for efficiently returning borrowed slots or resources to the system. As the client or device that has borrowed resources in a first timeslot or timeframe is declared as a proxy for the other clients, the debtor client is forced to return the borrowed resources again as it serves the $3^{rd}$ party registrations requests of the other clients.

According to a preferred embodiment, the step of reclaiming can include responding, by the SIP registrar server, in the second time period, to the register requests of the number of clients with a 200OK message comprising the IP address of the second client. The step of reclaiming can also include responding, by the SIP registrar server, to the register request of the second client with a 200OK message comprising the IP address of the SIP registrar server.

According to another preferred embodiment, the method further includes a step of blacklisting the second client, if the second client does not serve the third party registrations of the other clients of the number of clients. Moreover, it can be advantageous for the step of blacklisting of the second client to include excluding the second client from borrowing slots for sending register requests. Embodiments of the method may further comprise a step of releasing the second client from the blacklist, if the second client has returned the at least one slot lent in the first time period or returned each and every slot lent to it in the first time period. According to still another preferred embodiment, after the second client has been released from the blacklist, the method can include the step of lending, in a third time period, at least one slot not used by the first client to the second client after the second client has been released from the blacklist.

Preferably, the step of lending, in the first time period, the at least one slot not used by a first client to the second client is executed in response to the SIP registrar server receiving a number of register requests from the second client that exceeds the predetermined number of register requests which have been granted to the second client in the first time period.

An SIP registrar server for managing transmission resources in a SIP-based communication system is also provided. The SIP registrar server can be configured to receive register requests from a number of clients connected to the SIP registrar server via a communication network. The SIP registrar server can be configured to grant each client a predetermined number of register requests in a predetermined first time period. Each register request can correspond to a slot. The server can be configured as a type of machine (e.g. a computer device having hardware including a processor and a non-transitory computer readable medium). The SIP registrar server can be configured to lend, in the first time period, at least one slot not used by a first client to a second client and also be configured to subsequently reclaim, in a second time period, the at least one slot lent to the second client. In some embodiments, the SIP registrar server can effect the reclaiming by communicating with the second client and other clients to make the second client function as a proxy for the other clients according to a third party registration process.

It should be appreciated that the SIP registrar server can be a type of machine, such as a computer device or a communication device that includes a processor connected to a non-transitory computer readable medium. The SIP register server can include at least one interface and/or transceiver unit to facilitate communications via the communication network with the clients. The clients can also be configured as types of machines. For instance, the clients can be terminal devices that include a processor connected to a non-transitory computer readable medium. Each client can include at least one interface and/or transceiver unit to facilitate communications via the communication network with the clients, the SIP register server, or both the clients and the SIP register server.

It should also be appreciated that other embodiments of the apparatus and method can be configured in connection with other types of systems (e.g. non-SIP based systems or systems that function in accordance with other types of protocols).

Other details, objects, and advantages of the telecommunications apparatus and method will become apparent as the following description of certain exemplary embodiments thereof proceeds.

BRIEF DESCRIPTION OF THE DRAWINGS

The invention and embodiments thereof will be described below in further detail in connection with the drawings.

Figure 1:
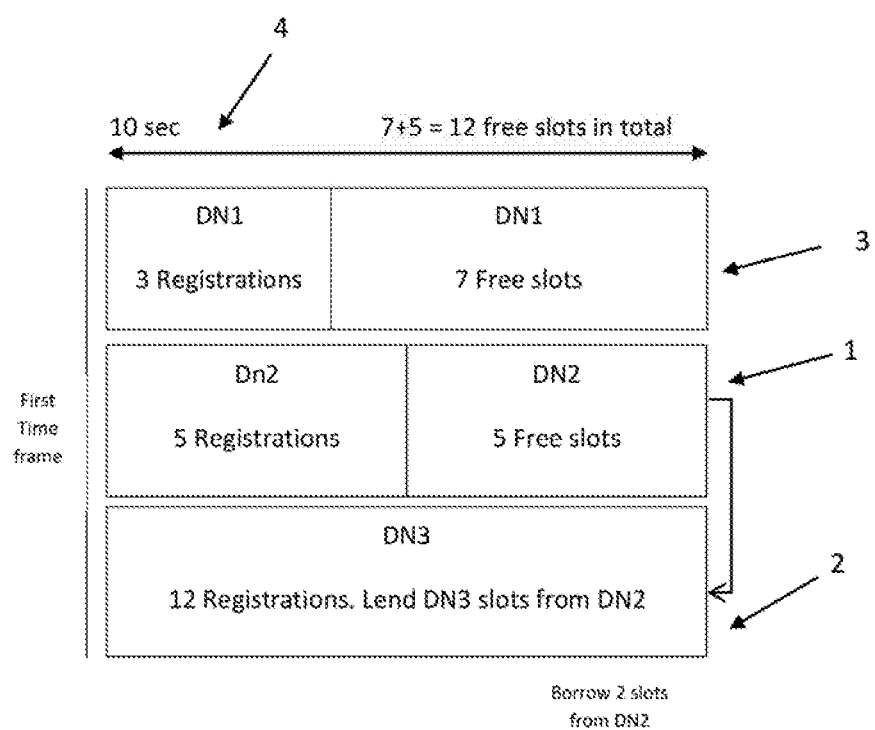
FIG. 1 schematically shows an exemplary communication scheme according to an embodiment of the invention illustrating the basic principle of distributing resources amongst a plurality of clients connected to a registrar server via a communications network.

Reference numerals utilized in the drawings include:
1 first client or first device DN1
2 second client or second device DN2
3 third client or third device DN3
4 fourth client or fourth device DN4
5 predetermined time period or time slot
6 Advanced Telephony Connector (ATC)
10, 11, 12 further clients or devices (DNX, DNX+1, DNX+N)
20 registrar server
30 communication system
T1 first time slot
T1+x subsequent time slot
Tx, Tx+1, Tx+2, Tx+3—timeframes

DETAILED DESCRIPTION OF EXEMPLARY EMBODIMENTS

FIG. 1 schematically shows a scheme illustrating the basic principle of the method for managing transmission resources according to an embodiment of the invention.

At first, the SIP registration process is briefly outlined. The typical SIP registration process is started by a user agent (the interface to the user; in the following, however, generally referred to as clients) sending a SIP REGISTER to the SIP registrar server, the request including the user's contact list. Upon receipt, the SIP registrar server sends back a challenge and upon receiving back a correct response, as a valid user ID and password, the SIP registrar server validates the user's credentials and registers the user in its contact database. Then, the SIP registrar server sends a 200 OK response, which includes the user's current contact list in contact headers.

Here, three client devices are involved, namely, a first client 1, a second client 2, and a third client 3, which are connected to a SIP registrar server (not shown) via a communication network (not shown), and which respectively send register requests (REGISTER) to the SIP registrar server. The SIP registrar server within a predetermined first time period or time slot 5, which here is 10 seconds, accepts a predetermined number of register requests from each client 1, 2, 3.

Each client 1, 2, 3 is allowed to send 10 register requests within the first time period 5 to the SIP registrar server. Each register request is sent within a predetermined slot, so that basically, there are 10 slots for each client 1, 2, 3 available within the first time period 5.

Further, as can be seen in the scheme of FIG. 1, the second client 2 (also indicated via DN2 in FIG. 1) has sent 5 register requests using 5 slots, so that there are still 5 slots available which the second client 2 has not used in the predetermined first time period or time slot 5.

Also, the first client 1 (indicated via DN1 in FIG. 1) has sent three register requests, and thus has still 7 slots available which the first client 1 has not used in the predetermined first time period 5.

However, the third client 3 (indicated via DN3 in FIG. 1) sends twelve register requests, exceeding his "budget" of slots by 2 slots. Thus, in this scenario for three clients 1, 2, 3, the predetermined number of register requests accepted by the SIP registrar server from each client 1, 2, 3 in the first predetermined time period 5 corresponds to a threshold value or current threshold value of 10 registrations, and the maximum of available slots is 30 slots for the first time period 5 in a pool of slots at the SIP registrar server.

Since the first client 1 and the second client 2 do not use all of their available slots in the first time period 5, in the pool of slots, there will be 5 unused slots from the second client 2 and another 7 unused slots from the first client 1, totaling in 12 unused slots which are still available in the first time period 5. Since the third client 3 has exceeded the current threshold value of 10 registrations by sending 12 register requests in the first time period 5, two slots are assigned to the third client 3 from the pool of unused slots. Thus, the third client 3 is able to "borrow" two slots from the pool for sending the two register requests exceeding the current threshold value for that client. Thereby, proper operation of the system can be maintained without affecting its performance, and the third client 3 will not be blacklisted as malicious as it would have otherwise been the case when using an The Intrusion Detections System (IDS) with tight thresholds.

It should be appreciated that the SIP registrar server can be a type of machine, such as a computer device or a communication device that includes a processor connected to a non-transitory computer readable medium. The SIP register server can include at least one interface and/or transceiver unit to facilitate communications via the communication network with the clients. The clients can also be configured as types of machines. For instance, the clients can be terminal devices that include a processor connected to a non-transitory computer readable medium. Each client can include at least one interface and/or transceiver unit to facilitate communications via the communication network with the clients, the SIP register server, or both the clients and the SIP register server.

Figure 2:
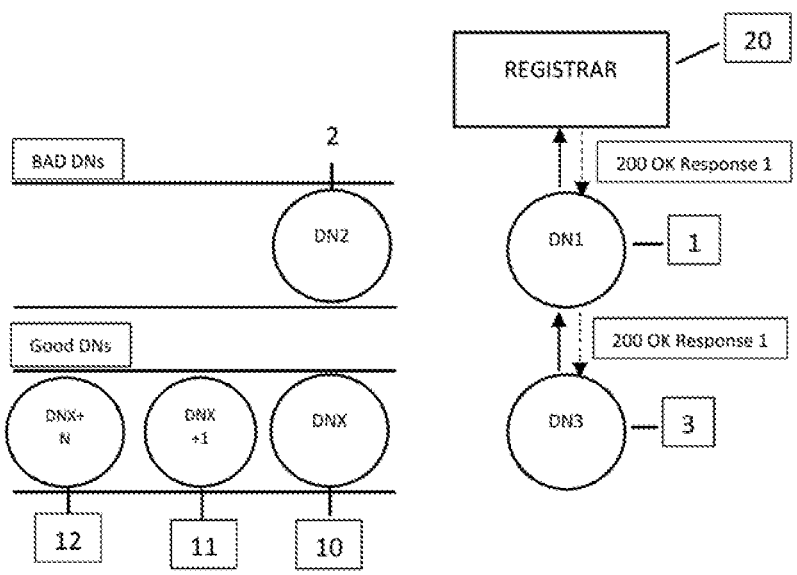
FIG. 2 schematically illustrates a communication system according to an embodiment of the invention.

FIG. 2 illustrates a communication system 30, on the basis of which an exemplary basic principle of reclaiming slots that can be utilized in embodiments of the apparatus and method is explained. A plurality of clients 1, 2, 3, 10, 11, 12 or devices DN1, DN2, DN3, DN3, DNx, DNx+1, DNx+n are connected to a SIP registrar server 20 via a communication network. In the embodiment shown here, the first client 1 or first device DN1 and the second client 2 or second device DN2 have borrowed slots, i.e. resources according to the method described above. In order to preserve the resource equilibrium in the system, the resources borrowed in the previous timeframe or timeframes need to be returned As mentioned above, in the embodiment illustrated here, there is a first client 1, a second client 2, a third client 3, and a plurality of further clients 10, 11, 12. The first client 1 and the second client 2 have borrowed slots, i.e., resources in the previous timeframe or timeframes. Thus, the slots borrowed are owed to the system and need to be returned. It is assumed that the clients in the system according to the embodiment illustrated here respectively support the third party registration mechanism functionality which is only supported for authenticated peers. By using the third party registration functionality, those clients which are considered to be "good" (namely, they have not borrowed resources or they have borrowed slots previously, but have returned them already to the system) will be forced to send a next registration through a "bad" (namely, a client that has borrowed resources in a previous timeframe) client. Thus, in this embodiment, the third client 3 is a "good" or legitimate device and it will be forced to send its next registration through a client that has borrowed resources in the previous timeframe or timeframes. In the example illustrated here, that is the first client 1. Thus, the legitimate third client 3 triggers a request to the first client 1 in order to identify potential malicious actions.

In detail, the procedure is as follows for the example of FIG. 2. Once registration is sent, but the information is for two devices or clients. This means that it is known that both clients, the first client 1 and the third client 3 are "alive". No additional registration is needed. Using this method, the load of the registrar server 20 can be reduced by N requests, wherein the variable N is proportional to the number of debtors (i.e., to the number of clients that have borrowed resources/slots in the previous timeframe or timeframes). In a normal system, each device or client should send only one registration. However, using the above described procedure, the load in the system will be reduced by N registrations. That is, the greater the number of so-called "bad" devices or clients in the system, the greater the number of the reduction in the number of the registrations (this rule applies for a population which remains lower or equal to the half of the devices).

Then the "bad" devices or clients will receive a "200 OK" final response, and it will forward the response to the legitimate device or client. Thereby, a twofold goal is achieved. Initially, the debtor is forced to prove that it is "good" (namely, not malicious; a bad device or client would most probably try to lead the legitimate device or client into a "starvation", by waiting for the response). The second reason is that the legitimate device or client is informed that it is registered and the system has knowledge of this situation. In this context, if the first client 1 receives a 200 OK positive response, but in turn continues to send redundant and borrow-related registrations, this means that either this device or client exhibits a software error, or it is malicious.

Every debtor (i.e., bad devices, like in the example the first client 1 (or first device DN1) and the second client 2 (or second device DN2) needs to support and serve the third party registration requests, as long as they are debtors (i.e., owe to the system since they have borrowed resources in one or more preceding timeframes). It is assumed, that a one to one mapping exists between borrowed slots and third party registration requests. Accordingly, the "bad" devices or debtors will return or are forced to return the borrowed resources. Namely, as soon the bad device or client (here, the first client 1 or first device DN1 and the second client 2 or second device DN2) begin to serve the third party registrations and forward all 200 OK responses correctly, then the bad device or client returns the previously borrowed resources back to the system (i.e., obtains service).

After a bad device or client (here, the first client 1 of first device DN1 and the second client 2 or second device DN2) has returned all slots borrowed previously (i.e., it has served the absolute number of borrowed slots in third party registrations), then a bad device or client will be able to borrow slots or resources from the system again.

Figure 3:
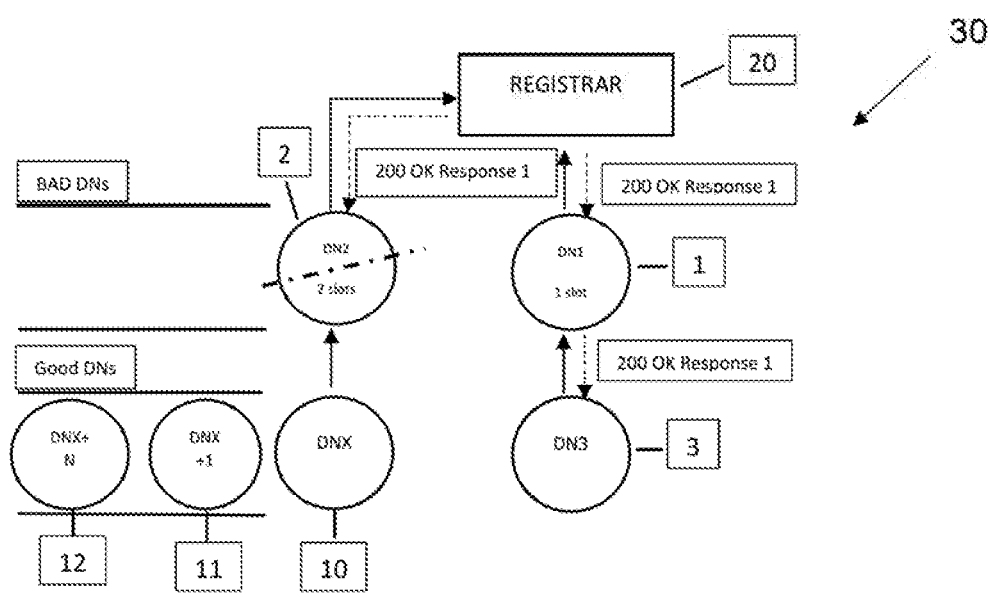
FIG. 3 schematically illustrates a communication system according to another embodiment of the invention.

FIG. 3 schematically illustrates a communication system 30 according to another embodiment of the invention, on the basis of which an exemplary procedure of blacklisting a bad device or client that does not properly return borrowed resources or slots back to the system will be explained. If a bad device or client does not want to contribute to the system, it will be blacklisted. This decision is mostly based on the so-called "selfishness" of a seemingly malicious device or client. That is, if a bad device or client sends multiple registrations—for any reason—it will not be difficult to serve a third party registration. However, if the bad device or client does not want to contribute but only sends redundant registrations in a "selfish" manner (i.e., it keeps borrowing slots or resources which not have been used by the other clients or devices in a predetermined timeframe) then it will be determined that there is something wrong with that client.

That means, in a first step the registrar server 20 will verify whether the device or client is acting "selfishly" or not. Here, the first device DN1 or first client 1 and the second device DN2 or second client 2 have borrowed resources in a previous timeframe. In order to make the debtor devices (DN1 and DN2) return the borrowed resources back to the system based on the third party registration functionality.

In the example shown in FIG. 3, the first client 1, or first device DN1, has borrowed one slot in a previous timeframe. It now serves the third party registration of the third client 3 or third device DN3 and thus, in the next timeslot, it will be considered as a "normal" device or client again. Therefore, it is automatically added to a queue of "good" devices or clients. In the next timeframe, both devices DN1 and DN3 will send their register requests directly to the registrar server.

Summarizing the above, a legitimate device or client will always send its register requests to the registrar, except for the case that the latter informs it explicitly not to do so. In this case, the registrar server will send the IP address of the proxy to the legitimate device or client. This information will be conveyed in a corresponding 200 OK response, a step earlier. Thus, in case the registrar server 20 wants to trigger the behavior of a suspicious device or client, it will force a legitimate device (like DN3 in the embodiment shown here) to request a third party registration by changing the contact address to the 200 OK. Assuming that the 200 OK response contains an IP address different from the IP address of the registrar server, then the "good" or legitimate device or client will forward the registration to the assigned "bad" device or client (here, DN1 for the example of FIG. 3) so that the "bad" device will be forced to return borrowed slots or resources back to the system, as already outlined above. It is noted that after informing a good or legitimate device or client (as in the example, DN3) where to send its next third party registration requests, the registrar server will monitor the devices or clients with OPTION requests, in order to deduce if the proxy device or client has tried to launch a "starvation attack") on the legitimate or "good" device.

In this context, the term starvation attack describes a debtor entity which denies to forward the 200 OK response to a non-debtor entity. The latter waits for the response (starvation). A so-called "good DN" refers to a network entity which does not owe slots, whereas a so-called "bad DN" refers to a network entity which owes slots. Finally, a so-called "selfish entity" refers to an entity which only wants to borrow slots, but will not return them to the system.

As also shown here in the example of FIG. 3, the second client 2 or second device DN2 has borrowed 2 slots in a previous timeframe. The same procedure concerning the third party registration as outlined above is carried out. However, the second client 2 or second device DN2 only serves the first request of the device DNx, but it is not responding to the second request or it is not forwarding the response. After these actions, the registrar server 20 will determine that the second client, or second device DN2, is potentially a problematic or malicious device. The second device DN2 or second client 2 will then be blacklisted by the registrar server 20 until the second device DN2 or second client 2 has fully served the number of requests which equal the borrowed slots or resources.

Figure 4:
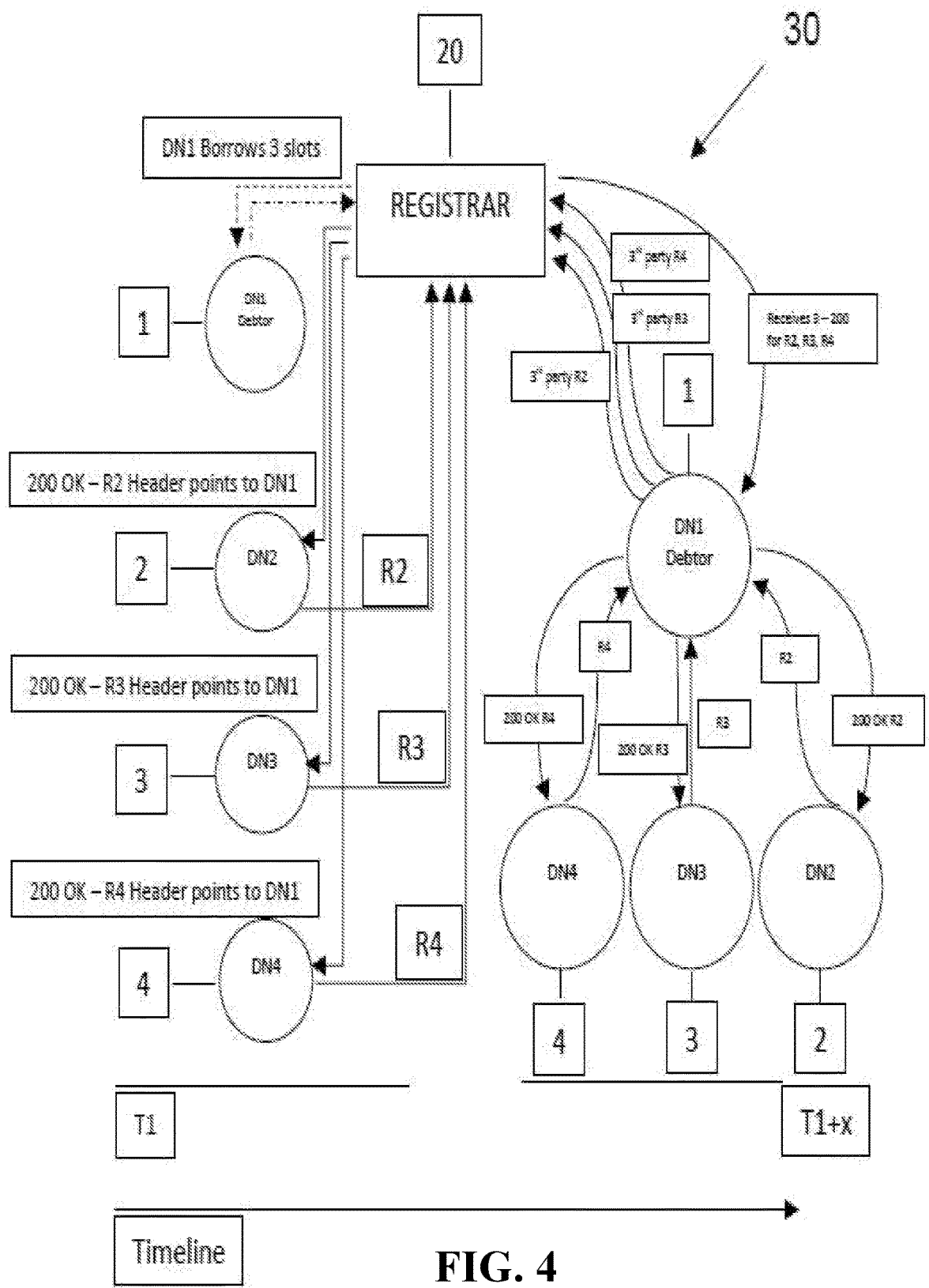
FIG. 4 schematically illustrates a communication system according to another embodiment of the invention.

FIG. 4 illustrates an embodiment of another communication system 30 on the basis of which the procedure of obliging so-called "selfish" peers to return borrowed resources. In the example shown here, it is assumed that there are four devices DN1 (or first client 2), DN2 (or second client 2), DN3 (or third client 3), DN4 (or fourth client 4) in the communication system 30, which are respectively connected to the registrar server 20 via a communication network. In a first timeframe or timeslot T1 (on the left hand side of the timeline), each one of the legitimate or "good" devices or clients (i.e., non-debtors: here, these are DN2, DN3, DN4) will send a register request as follows. The second device DN2 or second client 2 sends a register request R2 to the registrar server 20. The third device DN3 or third client 3 sends a register request R3 to the registrar server 20. The fourth device DN4 or fourth client 4 sends a register request R4 to the registrar server 20. Each one of the devices DN2, DN3, DN4 will receive a corresponding 200OK response from the registrar server 20 which contains the IP address of one of the debtors, which means in the example shown here, from the first device DN1 or first client 1 that borrows three slots according to the procedure explained with respect to FIG. 1. If there would be no debtor at all, then of course, the contact header will contain the IP address of the registrar server.

In the subsequent timeframe T1+x, the system knows the debtor, namely, DN1, from the previous timeframe T1. After receiving the initial registrations, in the first timeframe T1, as outlined above, the registrar server responds with a 200OK message.

Further, it is noted that the contact header for the debtors, or here, the debtor DN1, will comprise the registrar's IP address. Moreover, it is noted that every device should support the feature of $3^{rd}$ party registration (i.e., be $3^{rd}$ party registration-aware).

In the second subsequent timeframe, T1+x, after sending the $3^{rd}$ party registration requests (i.e., R2, R3, R4), if the "good" or legitimate devices DN2, DN3, DN4 receive the forwarded 200OK final responses (i.e., 200OK for request R2, 200OK for request R3, 200OK for request R4), the resource or slot/slots (here, 3 slots borrowed by DN1) have been given back to the system.

However, in case the debtor (here, DN1) does not send the 3rd party registration or it does not forward the 200OK response, then it will be blacklisted immediately.

Finally, it is noted that the final responses in the timeframe T1+x contain the IP address of the registrar server in the corresponding contact headers. Using this approach, the legitimate or "good" devices or clients are forced to send their registrations in the actual registrar server in a subsequent timeframe T1+x+1 (not shown here). Thus, if new debtors will appear in the next subsequent timeframe T1+x+1, then the corresponding 200OK responses targeting the legitimate devices will contain the necessary information to apply the procedure outlined above.

Figure 5:
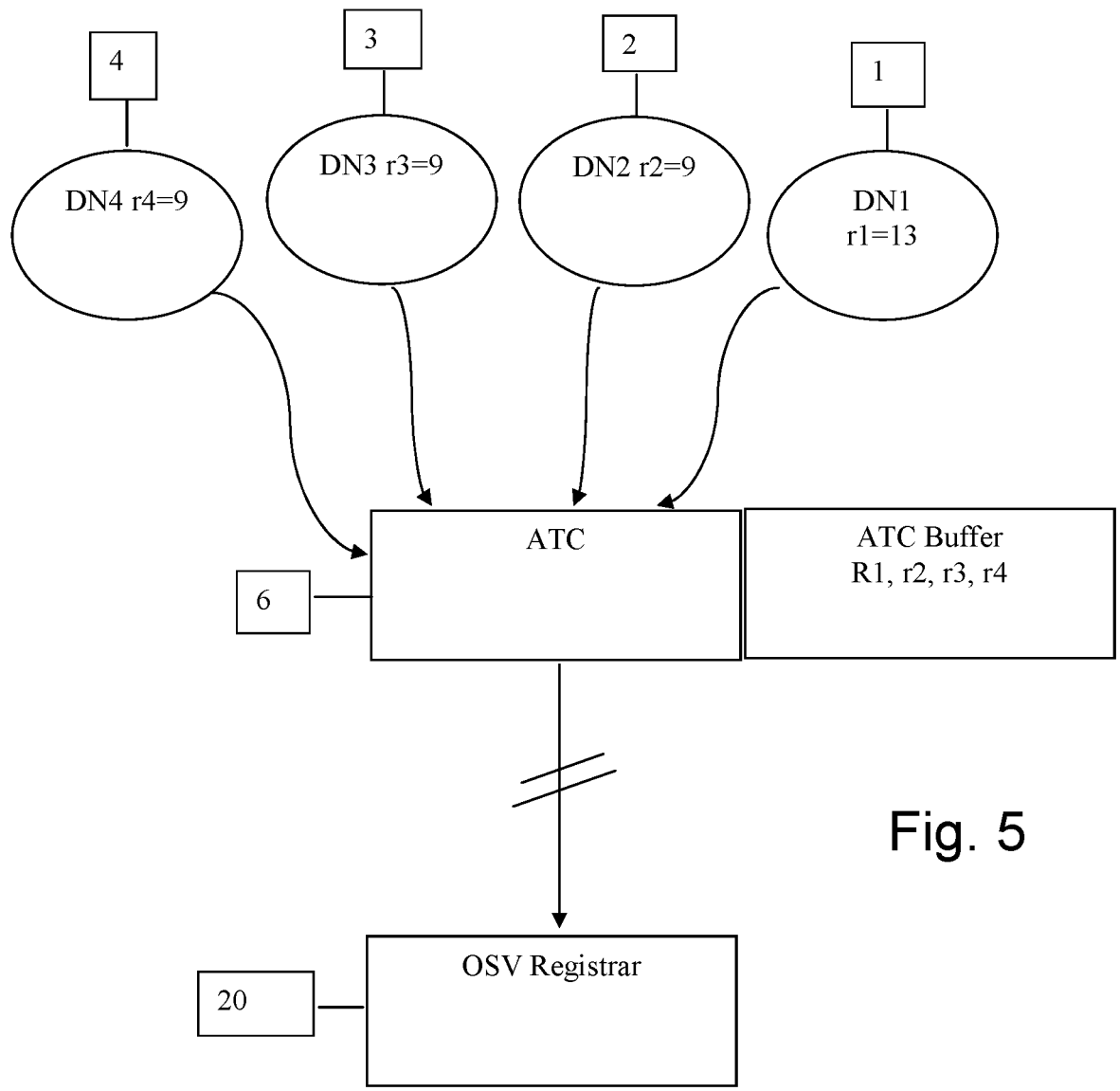
FIG. 5 schematically illustrates a communication system according to another embodiment of the invention at a first timeframe T1.

FIG. 5 shows a further communication system 30 on the basis of which an ATC failure will be explained. It is assumed here, that in a first timeframe T1, the devices DN1, DN2, DN3, and DN4 send their register requests to the registrar server 20, here an OSV registrar, via the ATC 6. The Intrusion Detections System (IDS) which is implemented on the OSV registrar 20, operates with static thresholds, i.e., it allows a maxLimit=10 Register Requests for every client in each timeslot or timeframe Tx. In this embodiment, the timeslot or timeframe will be Tx=10 seconds. Also, in this embodiment, the four devices DN1, DN2, DN3, DN4 send their register requests in timeslot or timeframe T1, as follows:

DN1 sends r1=13 register requests
DN2 sends r2=9 register requests
DN3 sends r3=9 register requests
DN4 sends r4=9 register requests Due to an ATC internal link failure, the ATC buffers r1, r2, 43, r4 are sent to the OSV registrar 20 in the form of a burst. Thus, the first device DN1 exceeds the maximum limit per client (i.e., maxLimit=10 register requests). Thus, the system will lend 3 free slots to DN1, as outlined with respect to FIG. 1. In order to retrieve the borrowed resources, the $3^{rd}$ party registration functionality is employed as outlined above. That is, in the first timeframe T1, all register requests arrive at the registrar server 20 (i.e., IP address: 10.1.1.6.) through the ATC 6 (i.e., IP address 10.1.1.7) and in the second timeframe the first client 1 or first device DN1, will be forced to function in the $3^{rd}$ party registration process. The treatment of the first client 1 or first device DN1 will be discussed below in connection with FIG. 6 to provide an example of how the "bad" first client will be treated to address its debtor status.

Figure 6:
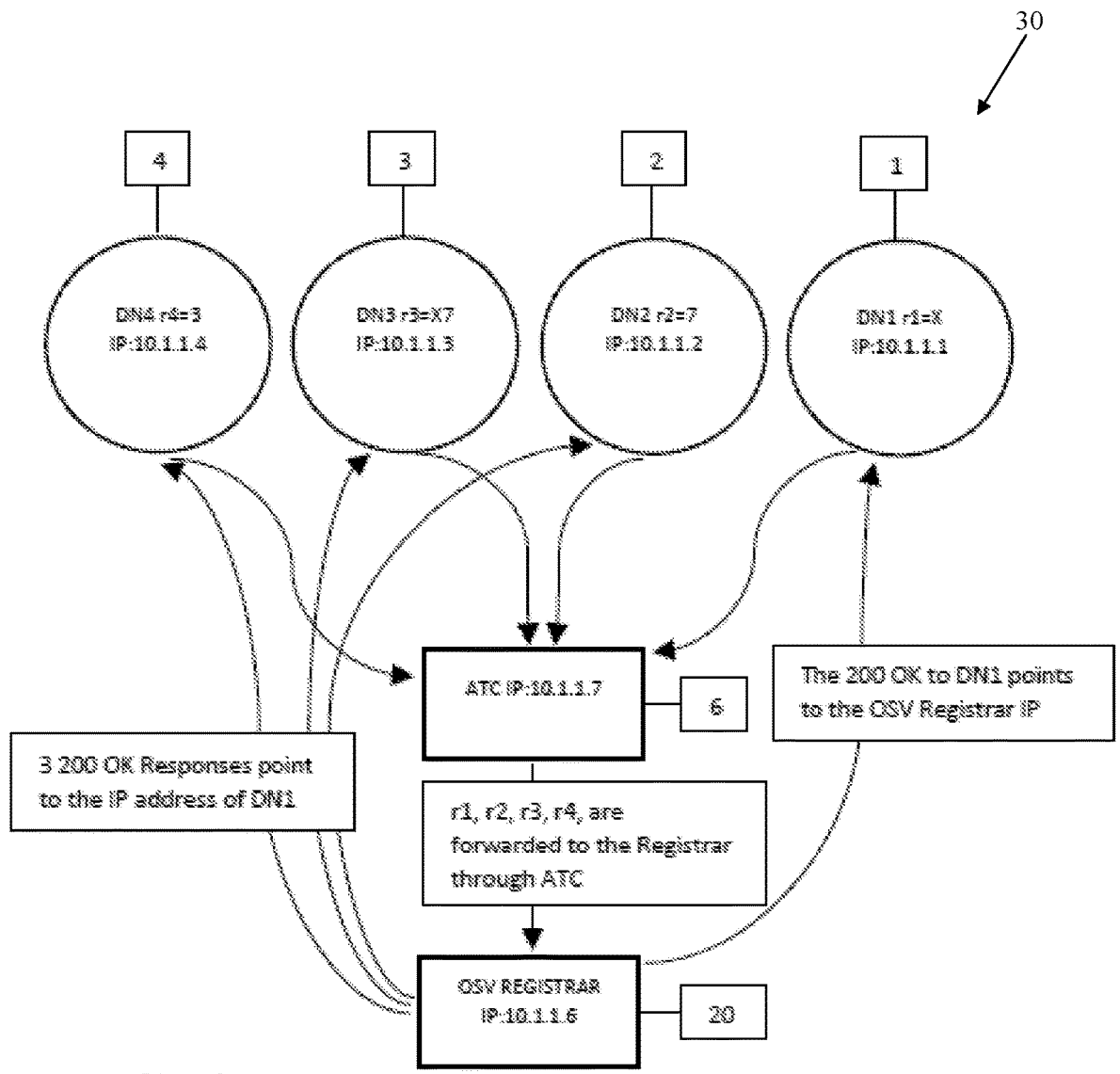
FIG. 6 schematically illustrates the communication system shown in FIG. 5 at a second timeframe T2.

FIG. 6 shows the communication system 30 shown in FIG. 5 at a second timeframe T1+x. Now, the system (or rather, the registrar server 30) knows that the first device DN1 borrowed 3 slots (i.e., borrowedSlots=3) in the first timeframe T1. Thus, based on the above described procedure, the registrar server 30 will force the "bad" device DN1 to return the borrowed slots by serving $3^{rd}$ party registration requests in a third timeframe T3. That is, DN1 is forced to act as a proxy, with the aim to return the borrowed slots or resources by using DN1 resources. Using this approach, only one $3^{rd}$ party registration request is sent, but in turn, there is the information for two. In other words, a $3^{rd}$ party registration means that one device will send a registration via a second device, and thus, when the server receives the $3^{rd}$ party registration, this message carries information both for the actual sender and the proxy that has been used. In this respect it contains information for both of the two devices.

More specifically, at T1+x, which is a second time frame in this example, the system or the registrar server 20 will send four 200OK responses. The first three 200OK responses will be sent to DN2, DN3, and DN4. These 200OK responses will contain the IP address of the "bad" debtor device DN1 in the contact header. This means that the OSV registrar server forces the legitimate or "good" devices DN2, DN3, DN4 to use DN1 as a proxy in the next timeframe T1+x+1, which is a third time frame in this example. The last 200OK response will be returned to DN1, but it will contain the IP address of the registrar server, i.e., 10.1.1.6. This is like telling DN1 to only send registrations to the registrar server.

Figure 7:
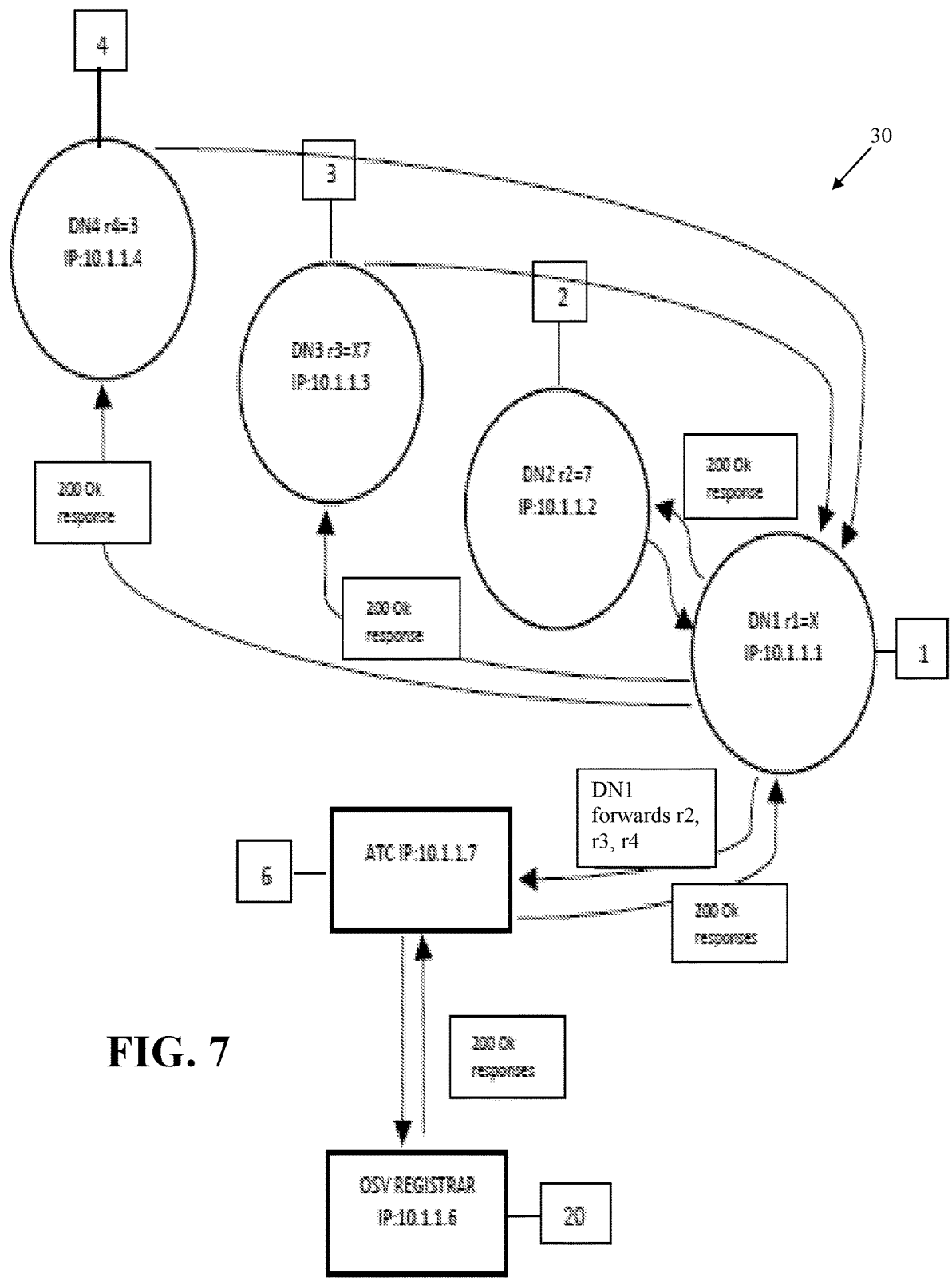
FIG. 7 schematically illustrates the communication system shown in FIG. 5 at a third timeframe T3.

Thus, as can be seen in FIG. 7, in the third timeframe, DN2, DN3, and DN4 will use the IP address of DN1 (i.e., 10.1.1.1 as shown in FIGS. 6 and 7) in order to perform third party registration requests. Upon receiving the three requests, DN1 will forward them to the OSV registrar server 20. The OSV registrar server 20 will receive three requests, but it will have the information for all the four devices DN1, DN2, DN3, and DN4. Thus, this is like saying to the first device DN1 to not send other redundant register requests, because we are aware that it is "alive". Upon receiving the 200OK responses, DN1 will forward them back to the clients and the resources will be given back to the system. Thus, in the subsequent timeframe, i.e., a fourth timeframe, the first device DN1 will be allowed to borrow resources or slots from the system again. If, however, DN1 continues to send redundant registrations (i.e., X is greater than the maxLimit), this is a violation of the rules and accordingly, DN1 will be blacklisted. Additionally, if DN1 fails to forward to the registrar server 20 the $3^{rd}$ party registration requests of other clients or it denies to return back a 200OK response, then it will also be blacklisted.

Figure 8:
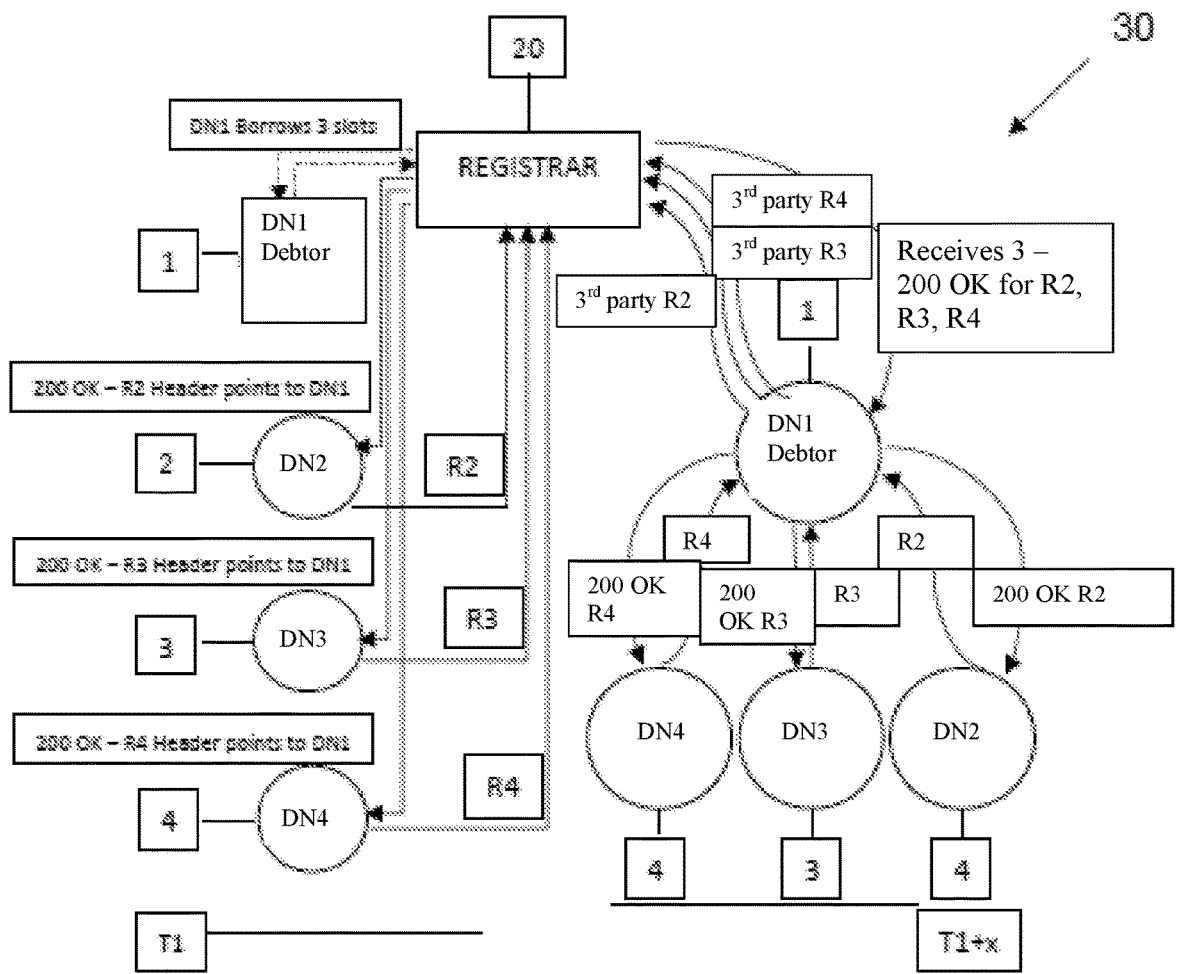
FIG. 8 schematically illustrates a communication system according to another embodiment of the invention.
Figure 8:
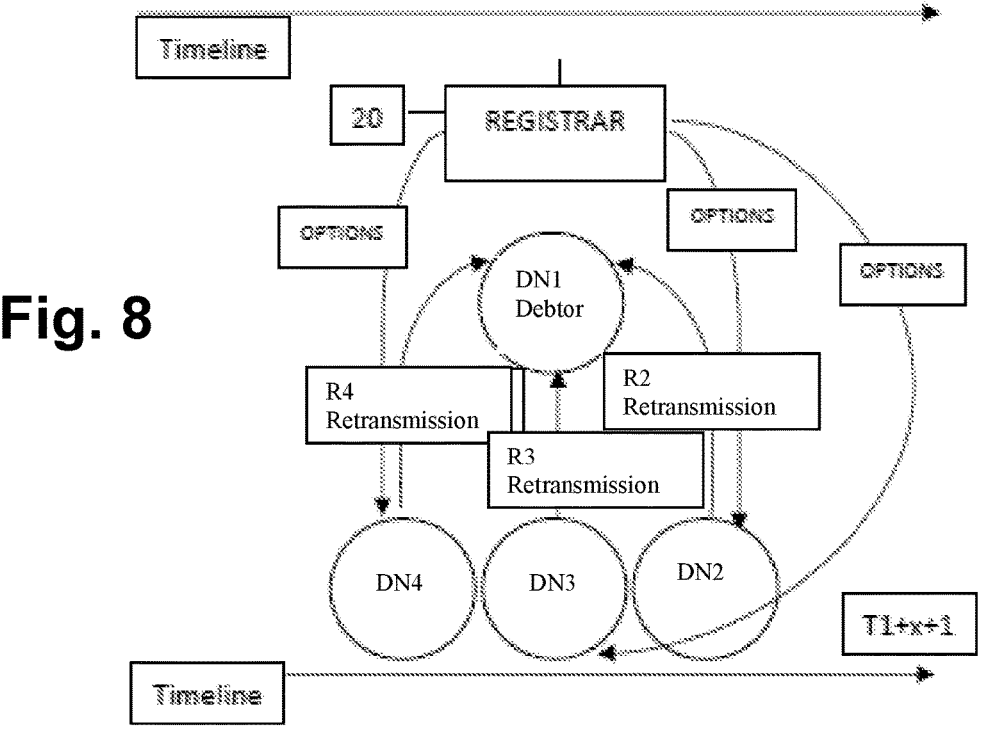

FIG. 8 illustrates a communication system 30 according to another embodiment of the invention, on the basis of which an example for addressing the so-called "starvation" problem is explained. It is now assumed that that the first device DN1 (for example, the "bad" device DN1 from FIG. 5-7) starts to act maliciously. One malicious behavior could be, for example, that DN1 does not forward the 200OK responses to the legitimate devices or clients (DN2, DN3, DN4 from FIG. 5-7). As noted above, the legitimate clients or devices will always send register requests directly to the registrar server 20 as the SIP registrar, except for the case that the registrar forces them to register with a different IP address. In the latter case, the legitimate devices will try to register with the system using the $3^{rd}$ party registration mechanism. The proxies will be always unknown, but the SIP registrar 20 will inform (i.e., provide the registrar IP address for the subsequent timeframe) the legitimate devices using the contact header in the 200OK response.

In FIG. 8, it is depicted what happens at T1, T1+x, and T1+x+1. As noted above, a problem will occur, if the "bad" device, here, DN1, will deny to forward back the 200OK responses. In this case, the legitimate devices DN2, DN3, DN4 will not receive the 200OK response and they will retransmit the request after a specific time period. Here, this is depicted in the timeslot or timeframe T1+x+1. As also mentioned above, the registrar server 20 knows that after obtaining a $3^{rd}$ party registration in one timeframe (e.g., in T1+x) from a specific device, this device should register directly with the registrar server in the subsequent timeframe T1+x+n, whereby n may not exceed the maximum value of the session timer applied in this device. For example, if the session timer for a specific device amounts to 60 seconds, then the SIP registrar server 20 should expect to receive a direct register request, at most in the next 6 timeslots or timeframes. After this period has elapsed, then the registrar server 20 knows that either the legitimate device has a network or hardware failure, or the "bad" device has not forwarded the 200OK response.

In the latter case, the malicious behavior will be exposed. For doing so, the "bad" device DN1 will be blacklisted by the registrar server 20. For instance, in case the registrar server 20 does not receive a register request directly from the legitimate devices in the subsequent timeframes, then the registrar server 20 should send on OPTIONS request to each one of the legitimate devices, in order to deduce if they are alive. In case, it is determined that they are alive, the registrar server 20 knows that DN1 maliciously has not forwarded the 200OK response and the registrar server 20 gives the new IP address to the legitimate devices so as to register. That is, at a further time period (e.g. T1+x+2), it is expected that the legitimate devices will register directly with the registrar server 20.

Figure 9:
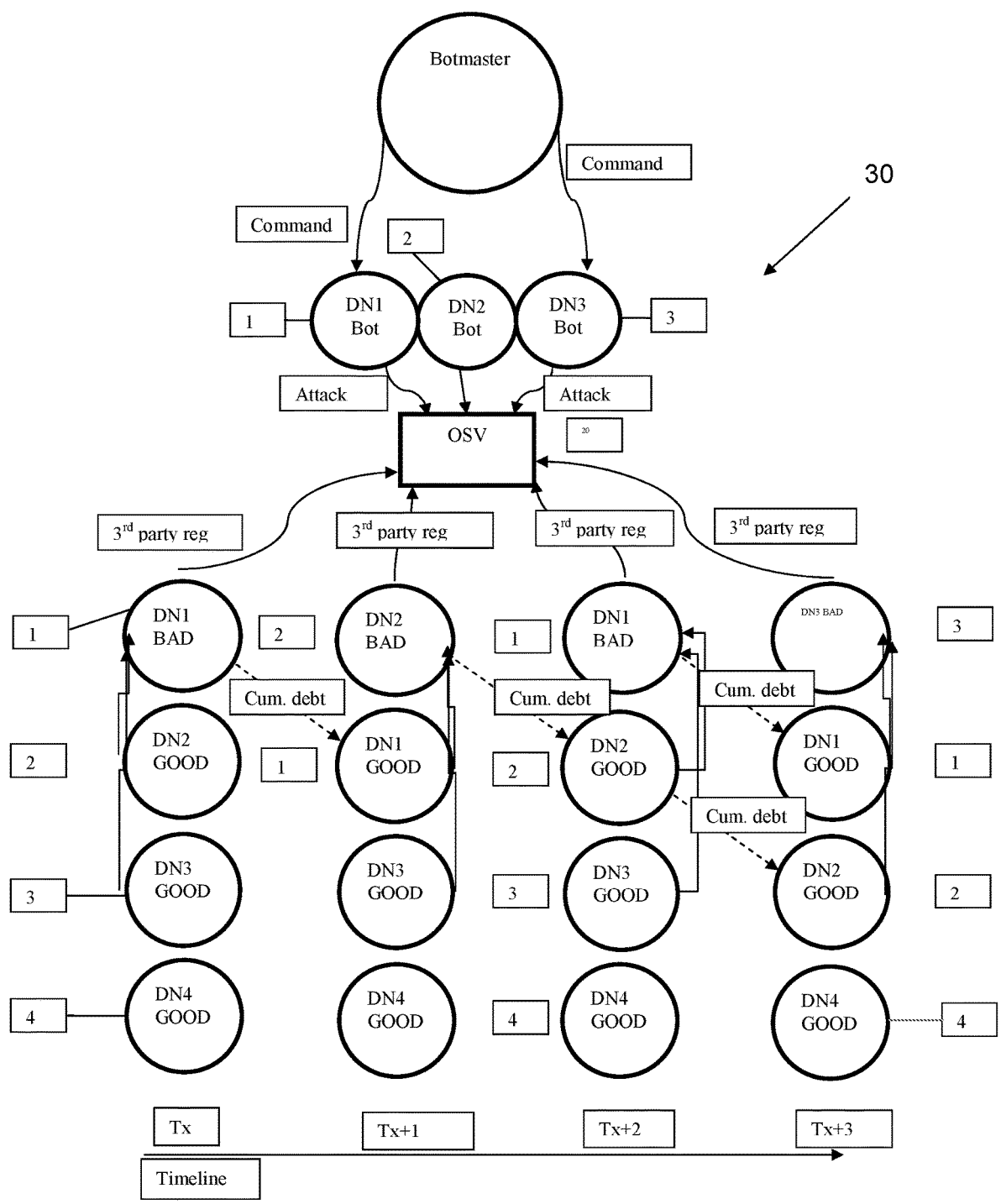
FIG. 9 schematically illustrates a communication system according to yet another embodiment of the invention.

FIG. 9 schematically illustrates a communications system according to still another embodiment of the invention, on the basis of which the so-called "starvation" problem is solved in accordance with another embodiment. As outlined above, a "bad" device may serve $3^{rd}$ party registrations (i.e., act as a proxy) in order to neutralize the owed debt. FIG. 9 illustrates multiple timeframes Tx, Tx+1, Tx+2, and Tx+3.

A problem may occur, if a bad device would serve the $3^{rd}$ party registration requests, but then deny to forward the corresponding 200OK response. In this way, the legitimate device could reach a so-called "starvation" state, as it would not have a possibility to register with the system. Additionally, the system would not be able to verify whether this specific device is alive. In order to solve this problem, a prioritization is implemented, according to which the legitimate devices are chosen in terms of which device will send the third party registration requests first. Namely, if the devices which are the top debtors—based on their borrowing history in previous timeslots or timeframes—are forced to perform $3^{rd}$ party registration requests to current "bad" devices (i.e., those which owe resources in a current timeslot or timeframe) then the possibility will be reduced that a device will face the so-called "starvation" due to the reasons outlined on the basis of the following scenario. The first device in the current timeframe that will be forced to send $3^{rd}$ party registration requests is most probably part of a botnet. This is because the device which will be forced to perform a $3^{rd}$ party registration was a so-called "bad device" in the previous timeslots. A so-called "good device" has a very small probability to be used as a means to serve a $3^{rd}$ party registration, simply because the most bad devices will be used first.

However, the registrar server 20 can be configured to determine whether this "bad" device is part of an "army", which is a number of infected devices which are communicating with other infected devices and/or with a botmaster with a hidden command and control (C&C) channel. Then the current bad device will not lead this device to starvation (i.e., it will forward the corresponding 200OK response). As this sorted array is traversed, the elements which exist in the bottom have a greater probability to be "good" devices. This is because the good devices will not present increased values of cumulative debt. Thus, the rest of the devices which present increased cumulative debt, will be positioned in the upper positions of the list. Additionally, the devices which are listed in the bottom of the list, do not seem to be top performers in terms of debt. Thus, this means that these devices have an increased probability to be good devices.

Additionally, if the first element is part of the army and receives a 200OK response, then all other devices should also receive a 200OK response. If the rest of the devices do not receive a 200OK response, then the bad device is exposed. That is, if it is assumed that the system has presented increased needs for redundant slots per timeframe in the previous timeframes (e.g., 10 previous timeframes), then a) either the devices exhibit a software or hardware error, or b) an attack has been launched.

We have determined that a device that exhibits a software or hardware error usually does not represent a trivial case of a top debtor. This holds true especially, when analyzing the device's behaviors in the last preceding N timeframes. Even if this is the case, this cumulative value will never exceed the corresponding value of the actual bad device. This is because a device that exhibits a software or hardware error may present a peak in terms of debt (as to borrowed resources or slots), but the median value of the corresponding debt will always be less than the debt of a malicious device (i.e., for example, top debtors). On the other hand, if this legitimate or good device meets the limit of the top debtor, then this value will be low enough so as to consider that an attack has not yet been launched. This situation is illustrated in the FIG. 9, whereby on the left hand side, it is depicted how a botmaster that is a malicious entity that handles and sends commands to a number of infected bots ("zombies") could send hidden commands to infected machines. In the scenario illustrated in FIG. 9, these would be the devices DN1, DN2, and DN3. After coordinating the bots and launching the attack, the following procedure would be performed in the OSV registrar server 20. Namely, in the following example, it is explained how proxies can be assigned to the good devices using the previously mentioned prioritization procedure, such that the bad devices are not able to launch the so-called "starvation" attacks.

As can be seen in FIG. 9, in the timeframe Tx, the first device DN1 or first client 1 is presented as being the "bad device". This is because the first device DN1 has been considered to be a "bad" device based on its behavior in the previous timeframes (i.e., Tx+1, etc.). That is, the indication of the arrow ("Cum.debt=5") extending from DN1 in timeframe Tx to DN1 in timeframe Tx+1 denotes that the first device DN1 owes 5 timeslots in the first timeframe. Now, it is assumed that the first device DN1 servers 5 $3^{rd}$ party registration requests, and thus it regains the status of a "good" device again in the subsequent timeframe, i.e., Tx+1.

In timeframe Tx+1, now, a different device becomes "bad", namely, the second device DN2, which in turn owes 4 timeslots as indicated by the arrow extending from DN2 in time slot Tx+1 to DN2 in time slot Tx+2 (e.g. arrow "Cum. debt=4") In this context, it is assumed that the second device DN2 serves the corresponding number of $3^{rd}$ party registration requests, and thus, in the next timeframe (i.e., Tx+2), it will be considered as being a "good" device again.

In every timeframe (i.e., Tx, Tx+1, Tx+2, etc.), the "most bad" devices are prioritized based on their previous behavior with respect to borrowing resources or slots. That is, in the timeframe Tx+1, the first device DN1 is forced first to send $3^{rd}$ party registration requests to the SIP registrar server 20. Based on the history, in the timeframe Tx+1, the first device DN1 currently is considered as being a "good" device, but still, it has been a "bad" device in the previous timeframe Tx, since it has borrowed four slots in that timeframe.

In timeframe Tx+2, the second device DN2 is forced first to send $3^{rd}$ party registration requests, because based on the system history, the second device DN2 was a debtor in the previous timeframe Tx+1. Following this procedure, cumulative values of debts are used so as to prioritize the "most bad" device that will be forced to first send the $3^{rd}$ party registration requests. Thus, using the above described procedure according to an embodiment, the "most bad" device in the previous timeframes have to be the ones that are so-called "zombies". Therefore, if in a specific timeframe, a bad device denies to forward the 200OK response, then it most probably will lead its "zombie peer" into so-called starvation. However, this is prevented to happen, because a bot will never launch an attack against a peer bot. This is because a bot (or infected device) will never launch an attack to a peer bot (infected device), because on the one hand, this does not serve the purpose of a botnet, and on the other hand, it decreases the attack impact of the botnet. Thus, a botmaster would not have any benefit to launch an attack to a bot (infected device).

On the other hand, if it is assumed that the previous hypothesis would not be applicable, then it is assumed that the "most bad" device is an actually good device in the network. This is because if the previous hypothesis is not true, then it means that the network does not have infected devices—or so-called "bad devices". And in turn, this means that the most bad device must owe slots due to a software or hardware error. For example the fourth device DN4 may become a "bad" device in a future timeframe Tx+n due to a software or hardware error. If the value of debt is the higher one, then it seems that either an attack has not been launched yet, or the actual "good" device (i.e., the fourth device DN4) will never cause a so-called starvation, because based on the assumption mentioned above, this device is a good device.

Additionally, by setting a high time value in a retry-after header in a 503 response, a potentially bad device may be exposed. This is applicable, if the "bad" device does not re-send the SIP registrar message through the proxy device that serves a third party registration. Thus, the bad device is offered a chance to conform to the register message sending rules. The time value provided in the retry-after header may be calculated according to the rate of the incoming register messages and may be a predefined number of slots that the system accounts for registrations requests.

Starting with a starting time, one device is declared to be a valid or "good" device supporting $3^{rd}$ party registration (proxy). Another one of multiple new devices then try to register and the current Address of Record (AOR) will be stored and a first response to the response to the new device or devices will contain a "retry after" time Tr and a $3^{rd}$ party registration (proxy) target from the list of good devices. Thus, if the new devices do not re-send the registration using a $3^{rd}$ party registration after the "retry after" time Tr (+/− guard time) or it does not serve the $3^{rd}$ party registration device, then this device will be placed in the black list. If the new device comes back via the $3^{rd}$ party registration servicing the device and within the "retry after" timeframe Tr (+/− guard time), a response containing "retry after" time Tr1 (+/− guard time), but without any 3rd party registration device will be sent back.

If the new device comes back after the "retry after" timeframe Tr1 (+/− guard time) and is directly received from the original AOR, the registration will be declared as being valid and the device or devices will become part of the valid (i.e. "good") devices and can be used as $3^{rd}$ party registration (proxy) devices.

Thus, using the above explained procedure, the $3^{rd}$ party registration device pool will continuously grow and provide a seamless registration method. It is noted that if a device is blacklisted, then no response will be sent back to that device for the time it is listed on the black list.

It should be appreciated that different embodiments of the system, apparatus, and method can be configured to account for a particular set of design criteria or design objectives. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a system, apparatus, and methods of making and using the same have been shown and described above, it is to be distinctly understood that the invention is not limited thereto but may be otherwise variously embodied and practiced within the scope of the following claims.

What is claimed is:

1. A method for managing transmission resources in a Session Initiation Protocol (SIP) based communication system by a SIP registrar server, wherein the SIP registrar server is configured to receive register requests from a number of clients connected to the SIP registrar server via a communication network, wherein each of the clients is granted a predetermined number of register requests in a predetermined first time period, each register request corresponding to a slot, the method comprising:

lending, in the first time period at least one slot not used by a first client of the number of clients to a second client of the number of clients;

reclaiming, in a second time period that occurs after the first time period, the at least one slot lent to the second client, the reclaiming comprising:

making the second client function as a proxy for other clients of the number of clients according to a third party registration process, responding, by the SIP registrar server in the second time period, to the register requests of the number of clients with a 2000K message comprising an address of the second client, and responding, by the SIP registrar server, to the register request of the second client with a 2000K message comprising an address of the SIP registrar server; and blacklisting the second client in response to the second client not serving third party registrations of the other clients of the number of clients.

2. The method according to claim 1, wherein the blacklisting comprises excluding the second client from borrowing slots for sending register requests.

3. The method of claim 2, comprising: releasing the second client from the blacklist after the second client has returned each and every slot lent in the first time period.

4. The method according to claim 3, comprising:

lending, in a third time period after the second client has been released from the blacklist, at least one slot not used by the first client to the second client.

5. The method according to claim 1, wherein the lending the at least one slot not used by a first client to the second client is executed after the SIP registrar server receives from the second client a number of register requests which exceeds the predetermined number of register requests which have been granted to the second client in the first time period.

6. A registrar server for managing transmission resources in a Session Initiation Protocol (SIP) based communication system, comprising:

the registrar server, the registrar server being an SIP registrar server comprised of a processor connected to a non-transitory computer readable medium;

the registrar server configured to receive register requests from a number of clients connected to the registrar server via a communication network, wherein the registrar server is configured to grant each client of the number of clients a predetermined number of register requests in a predetermined first time period, each register request corresponding to a slot;

the registrar server configured to lend, in the first time period, at least one slot not used by a first client of the number of clients to a second client of the number of clients and reclaim, in a second time period, the at least one slot lent to the second client;

wherein the registrar server is configured to reclaim the at least one slot lent to the second client by communicating with the clients to make the second client function as a proxy for other clients of the number of clients according to a third party registration process in the second time period; and wherein the registrar server is configured to blacklist the second client in response to the second client not serving third party registrations of the other clients of the number of clients in the second time period.

7. The registrar server of claim 6, wherein the second client is blacklisted by excluding the second client from borrowing slots for sending register requests.

8. The registrar server of claim 7, wherein the registrar server is configured to release the second client from the blacklist after the second client has returned each and every slot lent in the first time period.

9. A communication system comprising:
- a registrar server for managing transmission resources in a Session Initiation Protocol (SIP) based communication system, the registrar server being a SIP registrar server comprised of a processor connected to a non-transitory computer readable medium;
- the registrar server communicatively connectable to a communication network having a number of clients;
- the registrar server configured to receive register requests from the number of clients via the communication network, wherein the registrar server is configured to grant each client of the number of clients a predetermined number of register requests in a predetermined first time period, each register request corresponding to a slot;
- the registrar server configured to lend, in the first time period, at least one slot not used by a first client of the number of clients to a second client of the number of clients and reclaim, in a second time period, the at least one slot lent to the second client;
- the registrar server configured to reclaim the at least one slot lent to the second client by communicating with the clients to make the second client function as a proxy for other clients of the number of clients according to a third party registration process in the second time period; and
- the registrar server configured to blacklist the second client in response to the second client not serving third party registrations of the other clients of the number of clients in the second time period.

10. The communication system of claim 9, wherein the second client is blacklisted by excluding the second client from borrowing slots for sending register requests.

11. The communication system of claim 9, wherein the registrar server is configured to release the second client from the blacklist after the second client has returned each and every slot lent in the first time period.

12. The communication system of claim 9, wherein the registrar server is configured to lend the at least one slot not used by the first client to the second client in the first time period after the SIP registrar server receives from the second client a number of register requests which exceeds the predetermined number of register requests which have been granted to the second client in the first time period.

* * * * *